United States Patent [19]

Reed

[11] Patent Number: 4,941,185
[45] Date of Patent: Jul. 10, 1990

[54] IMAGE PROCESSING

[75] Inventor: Alastair Reed, Bedfordshire, England

[73] Assignee: Crosfield Electronics, London, England

[21] Appl. No.: 253,913

[22] Filed: Oct. 6, 1988

Related U.S. Application Data

[63] Continuation of Ser. No. 6,841,090, Mar. 13, 1986, abandoned.

[30] Foreign Application Priority Data

Mar. 18, 1985 [GB] United Kingdom ............... 8506931

[51] Int. Cl.$^5$ .................................................. G06K 9/36
[52] U.S. Cl. ...................................... 382/41; 364/724.1; 364/724.12
[58] Field of Search .................... 382/41, 42, 17, 31; 358/283, 432, 456, 457; 364/724, 726, 819, 521, 825, 576, 724.01, 724.05, 724.12

[56] References Cited

U.S. PATENT DOCUMENTS

| | | | |
|---|---|---|---|
| 4,060,850 | 11/1977 | Speiser | 364/819 |
| 4,194,221 | 3/1980 | Stoffel | 382/42 |
| 4,282,511 | 8/1981 | Southgate et al. | 382/42 |
| 4,293,912 | 10/1981 | Walters | 382/42 |
| 4,435,751 | 3/1984 | Hori et al. | 364/576 |
| 4,558,462 | 12/1985 | Horiba et al. | 382/42 |
| 4,651,293 | 3/1987 | Kato | 382/42 |

FOREIGN PATENT DOCUMENTS 0074795 3/1983 European Pat. Off. .

OTHER PUBLICATIONS

Stoffel et al., "A Survey of Electronic Techniques for Pictoral Image Reproduction", *IEEE Transactions on Communications*, vol. Com-29, No. 12, Dec. 1981, pp. 1898–1924.

Hayt, Jr., et al., *Engineering Circuit Analysis*, third edition, 1978, pp. 664–673.

*Primary Examiner*—Leo H. Boudreau
*Assistant Examiner*—Joseph Mancuso
*Attorney, Agent, or Firm*—Sughrue, Mion, Zinn, Macpeak & Seas

[57] ABSTRACT

A method and apparatus for processing a first (e.g. half-tone) image constituted by a second (e.g. continuous tone) image convolved with a periodic (screen) function, to produce the second image is described. The invention is particularly suited to handling digitally represented half-tone images. The apparatus comprises a microcomputer (17) for determining digital data defining a frequency filter characteristic adapted to suppress the frequency or frequencies of the periodic function. A fast Fourier transform circuit (11) transforms the image data into the frequency domain and a multiplier (12) multiplies the transformed data by the frequency characteristic stored in a store (13). The resultant multiplied data is inversely transformed back into the image of spatial domain by a fast Fourier transform circuit (14) to generate the second image.

19 Claims, 4 Drawing Sheets

IMAGE PROCESSING

This is a continuation of application Ser. No. 06/841,090 filed Mar. 13, 1986 now abandoned.

FIELD OF THE INVENTION

The invention relates to methods and apparatus for processing a first image represented by digital data and constituted by a second image convolved with a periodic function, to produce the second image.

DESCRIPTION OF THE PRIOR ART

In the printing industry, there is a common requirement to produce for example rotogravure cylinders from offset print originals. This is desirable economically in order to produce master prints at low cost. However, the offset prints which are half-tone images produced by applying a screen to a continuous tone original image consist of a dot raster and since this raster cannot in general be exactly conformed with the raster of the rotogravure cylinder, unwanted moire patterns can be generated. Various attempts have been made in the past to deal with this problem by optically descreening the half-tone original. These have generally resulted in a blurred image being produced which is clearly undesirable.

One attempt at dealing with this problem is described in IEEE Transactions on Communications vol COM-29 No 12, p 1917. A digital filter is described which suppresses certain screen frequencies but is not efficient for other screen frequencies. In addition it passes very high frequencies leading to the artefacts mentioned in the paper.

SUMMARY OF THE INVENTION

In accordance with one aspect of the present invention, apparatus for processing a first image represented by digital data and constituted by a second image convolved with a periodic function, to produce the second image, comprises means for determining a frequency filter characteristic adapted substantially to suppress the frequency or frequencies of the periodic function; a store for storing digital data defining the frequency filter characteristic; and control means for applying the filter characteristic to the digital data representing the filter image to generate digital data representing the second image.

In accordance with a second aspect of the present invention, a method of processing a first image represented by digital data and constituted by a second image convolved with a periodic function, to produce the second image, comprises generating in accordance with the frequency or frequencies of the periodic function digital data defining a frequency filter characteristic adapted substantially to suppress the frequency or frequencies of the periodic function, and storing the data; and applying the filter characteristic to the digital data representing the first image to generate digital data representing the second image.

We have recognized that an image which is screened or includes a regular pattern consists to a good approximation of two components, the continuous image multiplied by a periodic screen function or pattern. This will be explained in more detail below. By definition, the screen frequencies will be at least twice as high as the image information and thus the dot structure can be suppressed by suitable filtering.

We provide a dynamic system in which the filter characteristic is determined in accordance with the frequency to be suppressed. Thus an efficient filter will always result.

The invention is particularly suitable for handling half-tone images and these may have been generated for example using conventional analyse scanners or totally electronically. In any event, they will represent the convolution of a second image with a periodic function. Typically, the second image will be a continuous tone image and the periodic function a screen. The invention can be used, however, to remove other regular frequencies. In the former case the result of the application step is that at least the screen frequency or frequencies is suppressed and digital data is generated representing the continuous tone image.

If the filter characteristic and half-tone image are both defined in the spatial domain, the applying step may comprise convolving the digital data representing the half-tone image with the digital filter data.

One of the problems with convolving the filter characteristic with a half-tone image is the length of time involved. A typical A4 page represented digitally will include a very large number of pixels on each of which a complex computation must be carried out.

Preferably, therefore, the stored digital data defines the filter characteristic in the frequency domain, the step of applying the filter characteristic comprising transforming the half-tone image into the frequency domain to generate transformed image digital data, multiplying the transformed image digital data by the digital filter data to generate filtered digital data, and transforming the filtered digital data back into the spatial domain.

The advantage of working in the frequency domain is that the number of computations required is significantly reduced. Conventional transformation circuitry such as fast Fourier transform circuits can be used and descreening is achieved at a comparatively high speed.

A simple low pass filter having a top hat characteristic is not generally acceptable. We have analysed the reason for this and have discovered that when the filter characteristics are transformed into the spatial domain, they exhibit a significant degree of ringing. Preferably, therefore the filter characteristic has a smooth termination in the frequency domain.

Preferably, the generating step comprises generating an exponential filter of the form $y = k \exp{-x/\sigma)^n}$ where $y$ is related to the degree of transmission $k$ is a constant $x$ is a frequency, and $\sigma$ is the half width of the exponential and determining $\sigma$ such that when $x$ is set to the frequency to be suppressed $y/y_{max}$ is less than a predetermined value. $y_{max}$ is the value of $y$ corresponding to maximum transmission.

It will be appreciated that the control means could be provided by suitable hardware circuits or by a suitably programmed computer.

In the case of coloured images, the invention will be applied to each colour separation.

In one example, the filter characteristic defines a circularly symmetric low pass filter. The advantage of such a filter is that it can be applied to all colour separations, where the half-tone image is represented by a number of colour separations, since the filter is independent of screen angle and is therefore straightforward to implement.

A suitable filter characteristic is an exponential low pass filter of order 5. This has been found to transmit most of the picture information and to introduce negligible ringing and so is particularly suitable for suppressing screen frequencies.

In another example, the filter characteristic can define an ideal low pass filter determined experimentally to exactly filter out the screen frequency or frequencies. This would give slightly improved resolution over the circularly symmetric low pass filter since higher frequencies are transmitted and is suitable for removing regular, non-screen frequencies.

Preferably, the filter characteristic prevents the passage of frequencies above the frequency or frequencies of the periodic function and most preferably prevents the passage of substantially all these higher frequencies.

BRIEF DESCRIPTION OF THE DRAWINGS

Some examples of methods and apparatus in accordance with the invention will now be described and contrasted with the use of unsuitable filters with reference to the accompanying drawings, in which.

DETAILED DESCRIPTION OF EMBODIMENTS

A screened image ($I_{screen}$) consists to a good approximation of two components, a continuous image ($I_{cont}$) multiplied by a screen ($S_{grid}$).
Thus:

$$I_{screen}(x,y) = I_{cont}(x,y) \cdot S_{grid}(x,y).$$

$$\text{where } S_{grid}(x,y) = C_{comb}(x,y) * D_{dot}(x,y)$$

where $C_{comb}$ is a two dimensional comb filter, $D_{dot}$ is a function which converts the sampled grey level to a dot of variable size (see D. Kermisch and P. G. Roetling, Journal of the Optical Society of America 65, 716 (1975)), and * signifies convolution.

Taking the Fourier transform $$\bar{I}_{screen}(u,v) = \bar{I}_{cont}(u,v) * \bar{C}_{comb}(u,v) \cdot \bar{D}_{dot}(u,v).$$

since the Fourier transform of a two dimensional comb filter is another two dimensional comb.

In other words the picture information is convolved with a two dimensional comb which is modulated by a slowly varying function $D_{dot}$. By definition, the screen frequencies are at least twice as high as the picture information.

Figure 1A:
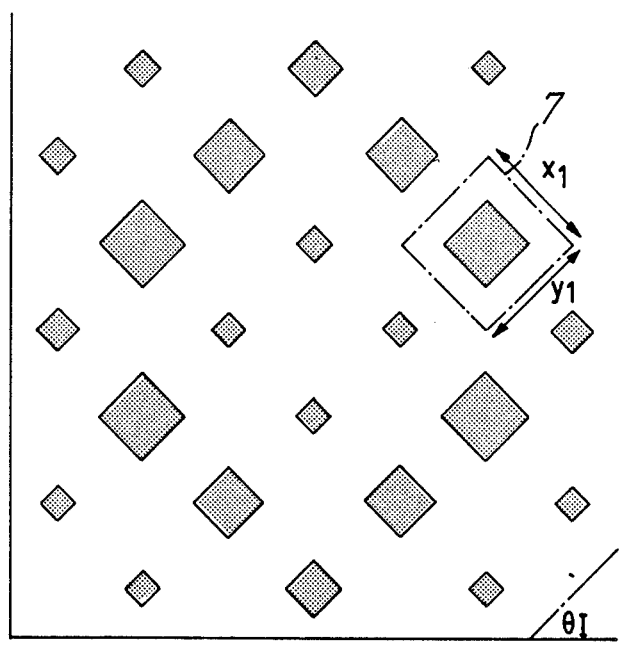
FIGS. 1A and 1B illustrate a screened image in the spatial domain and frequency domain respectively.
Figure 1B:
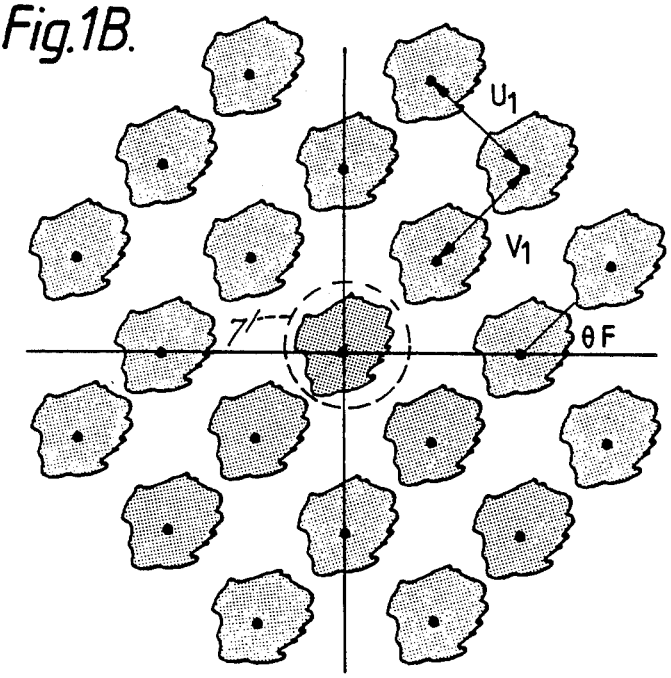

FIG. 1A illustrates a small portion of a screened image in the image or spatial domain. Each stippled square is a half-tone dot, the sizes varying according to the colour densities of pixels in the continuous tone image. FIG. 1B illustrates the Fourier transform (power spectrum) of the screened image in two dimensions. The dot structure can be suppressed by applying a suitable low pass filter in the frequency domain to transmit the picture information only. The radius of the filter can be found from the power spectrum.

Figure 6:
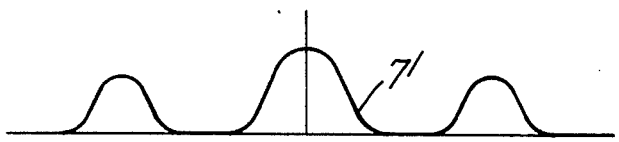
FIG. 6 illustrates the average power spectrum in one dimension in the frequency domain.
Figure 7:
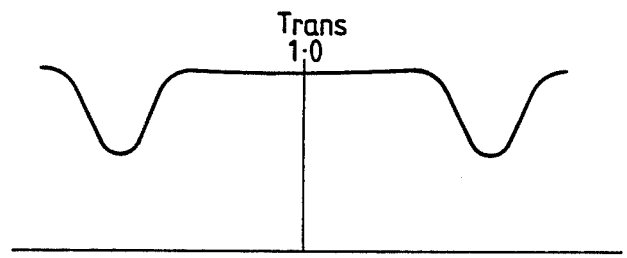
FIG. 7 illustrates the filter power spectrum in one dimension.

It will be noted in FIGS. 6 and 7 that the low pass filter is smoothly terminating in the frequency domain to minimise ringing in the image when the inverse transform is taken but allows substantially all image frequencies to pass.

Figure 3:
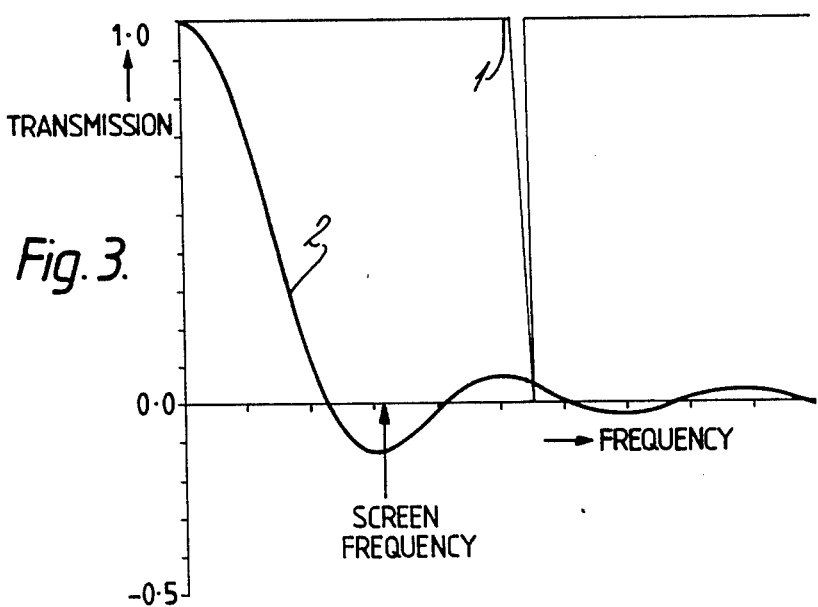
FIG. 3 illustrates a top hat function low pass filter together with its inverse Fourier transform.

A top hat function 1 and its Fourier transform 2 is illustrated in FIG. 3. This function introduces ringing in the spatial domain as expected theoretically, since the inverse transform of a top hat function is a two dimensional Bessel function due to its sharp terminations which is then convolved with the picture in image space. This will not produce a satisfactory result.

An ideal low pass filter ($F_{ILP}$) would be a mask as shown by the dotted line 7 in FIG. 1A, convolved with the image in image space. The mask has a transmission of 1 within it and zero everywhere else and a size related to the screen spacing.

$$\bar{I}_{screen}(x,y) * \bar{F}_{ILP}(x,y) = \bar{I}_{cont}(x,y).$$

To construct this mask, the screen angle and spacing of the separation to be descreened is needed. This information can be obtained from the average power spectrum of the screened image (FIG. 5), where $$x_1 = 1/u_1$$

$$y_1 = 1/v_1$$

$$\theta_I = \theta_F$$

$x_1, y_1$ is the screen spacing in image space,
$\theta_I$ is the screen angle in image space,
$u_1, v_1$ is the screen spacing in frequency space, and,
$\theta_F$ is the screen angle in frequency space.

The screen information in frequency space can be used to generate automatically a filter of either the exponential or "ideal" kind, using the methods described below.

The ideal low pass filter ($F_{ILP}$) can be constructed in image space, transformed and applied in frequency (eg. Fourier) space in for example a suitably programmed microcomputer. The transformed filter ($\bar{F}_{ILP}$) then multiplies the transformed image ($\bar{I}_{screen}$) to yield the transformed continuous image ($\bar{I}_{cont}$).

Thus:
$$\bar{I}_{screen}(u,v) \cdot \bar{F}_{ILP}(u,v) = \bar{I}_{cont}(x,y).$$

Taking the inverse transform gives the continuous image.

$\bar{F}_{ILP}$ is a two dimensional sinc function which has zeros at the screen frequencies as illustrated by reference 7' in FIGS. 1B and 6. This function can be approximated in frequency space as follows. The picture is divided into blocks and the power spectra of these blocks are averaged. The picture information transform will vary from block to block, while the grid transform stays constant.

$$|\bar{I}_{screen}(u,v)| = |\bar{I}_{cont}(u,v)| * |\bar{S}_{grid}(u,v)|$$

The average will then be the grid transform convolved with a circularly symmetrical function M (u,v) which is slowly varying compared to the screen. M (u,v) has a two dimensional Gaussian type distribution.

$$<|\bar{I}_{screen}(u,v)|> = \bar{M}(u,v) * <|\bar{S}_{grid}(u,v)|>$$

where <> signifies the average.
and $$<|\bar{S}_{grid}(u,v)|> = |\bar{S}_{grid}(u,v)|$$

since the screen has a regular structure across the picture.

Figure 5:
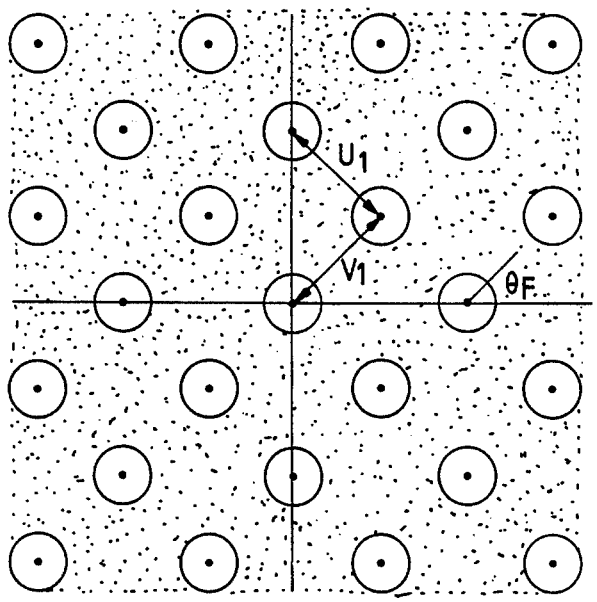
FIG. 5 illustrates the average power spectrum in two dimensions in the frequency domain.

The average power spectrum is of the form shown in FIG. 5. A one dimensional cross-section is shown in FIG. 6.

Using a radial threshold, low frequencies are set to zero. The resultant is then inverted to produce the screen filter as shown in one dimension in FIG. 7.

$$\bar{S}_{grid}(u,v) \cdot \bar{S}_{grid\atop filter}(u,v) = C$$

where C is a constant $$\bar{I}_{screen}(u,v) \cdot \bar{S}_{grid\atop filter}(u,v) = C \cdot \bar{I}_{cont}(u,v)$$

or in image space $$I_{screen}(x,y) * S_{grid\atop filter}(x,y) = S(x,y) * I_{cont}(x,y)$$
$$= I_{cont}(x,y).$$

This method would be particularly useful when the background pattern had frequencies close to the rest of the image information and it is desired to remove the background pattern. The regular background would then be hard to identify in image or frequency space unless an average was taken.

In practice the minimum attenuation of the "valleys" in the FIG. 7 characteristic will be set at or below a predetermined threshold. For example such that (min transmission)/(max transmission) $< 10^{-4}$.

Although the invention has been described in connection with the use of Fourier transforms other well known transforms could also be used.

An exponential filter characteristic of order 2 (reference numeral 3 in FIG. 2) is acceptable since it has a smooth termination 4. Such a characteristic avoids ringing when transformed but will suppress quite low frequencies i.e. the picture could be blurred. In this example the characteristic has the form $y = \exp(-0.347(x/\sigma)^2)$
where
y is related to the degree of transmission
x is a frequency, and
$\sigma$ is the half width of the exponential.

Figure 2:
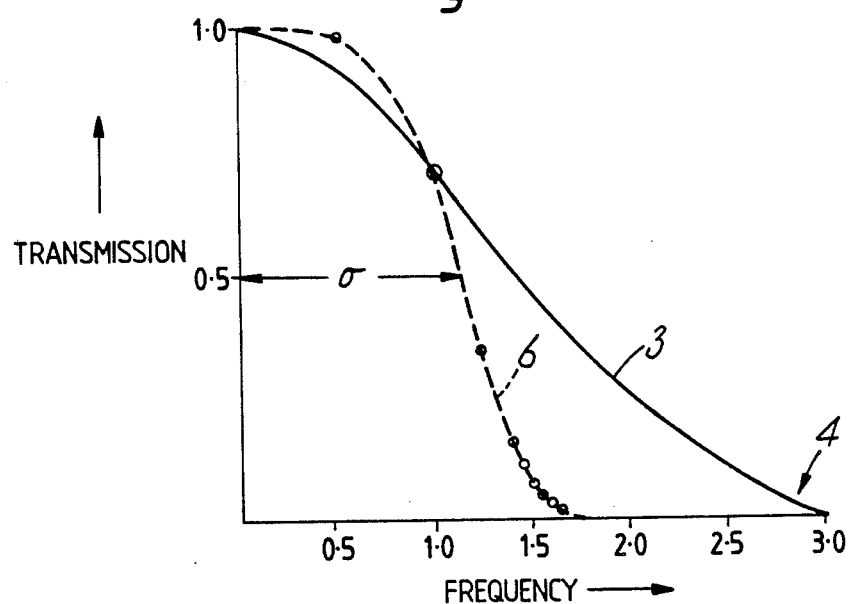
FIG. 2 illustrates the transmission characteristic of two exponential low pass filters in the frequency domain.
Figure 4:
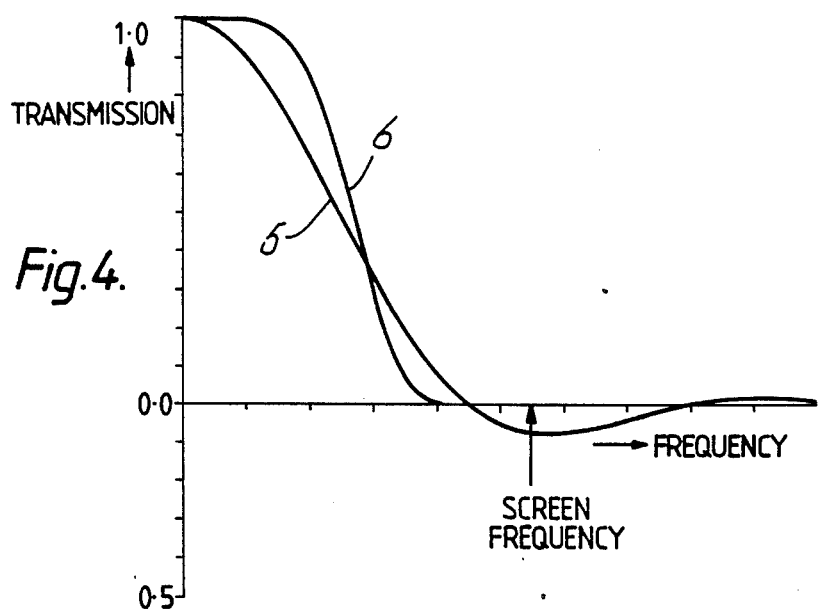
FIG. 4 illustrates an order 5 exponential filter with its inverse Fourier transform.

We have found however that the transform 5 of an exponential filter of order 5 (of the form $y = \exp(-0.347(x/\sigma)^5)$ reference numeral 6 in FIGS. 2 and 4) has slight ringing (FIG. 4), compared with the transform of an exponential of order 2 which is another exponential of order 2, and transmits most of the picture information. This thus provides an acceptable filter characteristic.

In these cases $\sigma$ (see FIG. 2) is determined when the frequency to be suppressed has been found using the methods described above. $\sigma$ is set such that when x equals the frequency to be suppressed $y/y_{max} < 10^{-4}$.

Figure 8A:
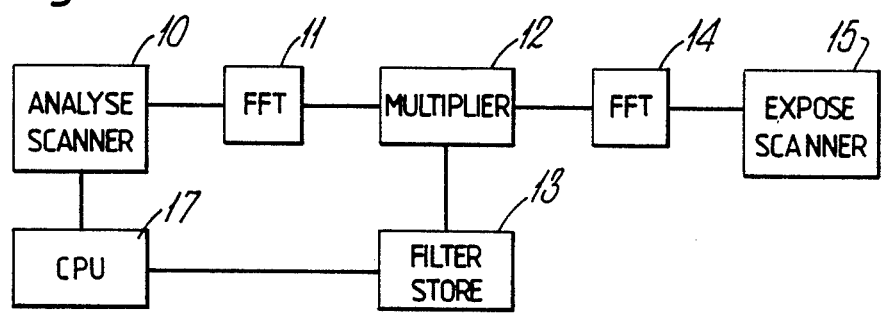
FIGS. 8A 8B illustrate in block diagram form two examples of apparatus according to the invention.
Figure 8B:
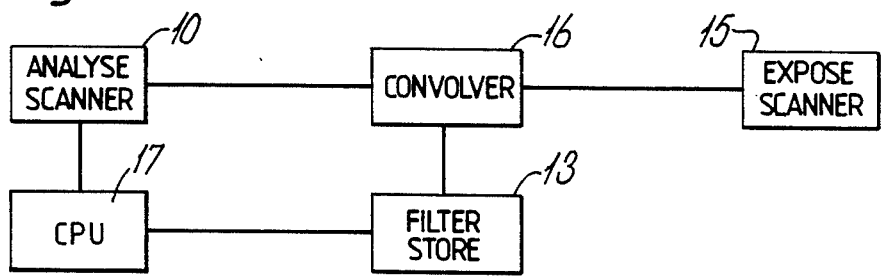

Two examples of apparatus for carrying out the invention are illustrated in FIGS. 8A and 8B. The apparatus shown in FIG. 8A comprises a conventional analyse scanner 10 which scans an original image such as a transparency and generates corresponding digital data representing the colour content of individual pixels of the image. This digital data is transformed from the image or spatial domain into the frequency domain by the fast Fourier transform circuit 11. The output from the circuit 11 is fed to a multiplier 12 where it is multiplied by digital data from a filter store 13 representing a low pass filter, of the kind described above, in the frequency domain. This multiplication involves the contents of each pixel in the frequency domain being multiplied by the content of the equivalent pixel in the filter. The resultant data is inversely transformed by another fast Fourier transform circuit 14 back into the image or spatial domain and the resultant data is sent to a conventional expose scanner to control a laser beam which exposes a record medium.

The filter characteristic is determined by a microcomputer 17 which not only sets the type of filter (exponential, ideal etc) but also its form (as explained above) by determining the screen frequency of the scanned image from the digital data generated by the analyse scanner 10 and setting the filter characteristic so that the percentage of the screen frequency passed is at or below a predetermined level eg. 0.01%.

An alternative apparatus is shown in FIG. 8B having conventional analyse and expose scanners 10, 15, a microcomputer 17, and a filter store 13. In this case, however, the image data from the analyse scanner 10 is processed in the spatial domain by being convolved with a filter, defined also in the spatial domain, by a conventional convolving circuit 16.

It is important to note the difference between the two processes since the convolution of a filter with the image will take much longer due to the greater number of computations than the multiplication and transformation of data illustrated in FIG. 8A. Typically, the number of computations required for convolution is $N^4$ where N is the number of pixels in the side of a square portion of the half-tone image while the number of computations carried out in the FIG. 8A apparatus is $(N\log_2 N)^2$.

I claim:

1. Apparatus for processing a first image represented by digital data and which is a convolution of a second image and a periodic function, to produce said second image, the apparatus comprising means for determining a two-dimensional frequency filter characteristic which suppresses the frequency or frequencies of said periodic function and higher order harmonics of said frequency or frequencies; a store for storing digital data defining said two-dimensional frequency filter characteristic; and control means for applying said two-dimensional frequency filter characteristic to said digital data representing said first image to generate digital data representing said second image.

2. Apparatus according to claim 1, wherein said stored digital data is adapted to define said filter characteristic in the spatial domain, said control means convoluting said digital data representing said first image with said digital filter data.

3. Apparatus according to claim 1, wherein said stored digital data defines said filter characteristic in the frequency domain, said control means being adapted to transform said first image into the frequency domain to generate transformed image digital data, to multiply said transformed image digital data by said digital filter data to generate filtered digital data, and to transform said filtered digital data back into the spatial domain.

4. Apparatus according to claim 1, wherein said control means comprises a suitably programmed computer.

5. Apparatus according to claim 1, further comprising second image exposing apparatus responsive to said signals representing said second image to cause said second image to be exposed on a record medium.

6. Apparatus according to claim 1, wherein said filter characteristic prevents the passage of frequencies above said frequency or frequencies of said periodic function.

7. Apparatus according to claim 6, wherein said filter characteristic prevents the passage of all frequencies above said frequency or frequencies of said periodic function.

8. Apparatus according to claim 1, wherein said filter characteristic defines an exponential low pass filter.

9. A method of processing a first image represented by digital data and which is a convolution of a second image and a periodic function, to produce said second image, the method comprising generating, in accordance with the frequency or frequencies of the periodic function, digital data defining a two-dimensional frequency filter characteristic which suppresses said frequency or frequencies of said periodic function and higher order harmonics of said frequency or frequencies, and storing said digital data defining said two-dimensional frequency filter characteristic; and applying said two-dimensional frequency filter characteristic to said digital data representing said first image to generate digital data representing said second image.

10. A method according to claim 9, wherein said stored digital data defines said filter characteristic in the spatial domain, said step of applying said filter characteristic comprising convoluting said digital data representing said first image with said digital filter data.

11. A method according to claim 9, wherein said stored digital data defines said filter characteristic in the frequency domain, said step of applying said filter characteristic comprising transforming said first image into the frequency domain to generate transformed image digital data, multiplying said transformed image digital data by said digital filter data to generate filtered digital data, and transforming said filtered digital data back into the spatial domain.

12. A method according to claim 9, wherein said generating step comprises generating an exponential filter of the form $y = k \exp(-x/\sigma)^n$
where
$y$ is related to the degree of transmission
$k$ is a constant
$x$ is a frequency, and
$\sigma$ is the half width of the exponential
and determining $\sigma$ such that when $x$ is set to the frequency to be suppressed $y/y_{max}$ is less than a predetermined value.

13. A method according to claim 12, wherein said predetermined value is substantially $10^{-4}$.

14. A method according to claim 12, wherein n is less than or equal to 5.

15. A method according to claim 9, wherein said filter characteristic is circularly symmetric.

16. A method according to claim 9, wherein said filter characteristic suppresses frequencies adjacent to the frequency of said periodic function and frequencies adjacent higher order harmonics of said periodic function frequency.

17. A method according to claim 9, wherein said first image is a half-tone image and said periodic function comprises a screen.

18. A method according to claim 9, further comprising determining said frequency or frequencies to be suppressed by analysing said first image.

19. A method according to claim 18, wherein said frequency to be suppressed is determined by calculating the average power spectrum of said first image.

* * * * *